United States Patent
Liu et al.

(10) Patent No.: US 12,261,732 B2
(45) Date of Patent: Mar. 25, 2025

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/604,518

(22) Filed: Mar. 14, 2024

(65) Prior Publication Data

US 2024/0223431 A1 Jul. 4, 2024

Related U.S. Application Data

(63) Continuation of application No. 17/509,092, filed on Oct. 25, 2021, now Pat. No. 11,962,453, which is a continuation of application No. PCT/CN2020/082319, filed on Mar. 31, 2020.

(30) Foreign Application Priority Data

Apr. 26, 2019 (CN) .......................... 201910345267.7

(51) Int. Cl.
*H04L 27/26* (2006.01)
*H04W 56/00* (2009.01)

(52) U.S. Cl.
CPC .... *H04L 27/2657* (2013.01); *H04L 27/26025* (2021.01); *H04W 56/0045* (2013.01)

(58) Field of Classification Search
CPC ........... H04L 27/26025; H04L 27/2607; H04L 27/26524
See application file for complete search history.

(56) References Cited

U.S. PATENT DOCUMENTS

| 11,962,453 | B2* | 4/2024 | Liu .................. H04W 56/0045 |
| 2019/0053182 | A1 | 2/2019 | Choi |
| 2019/0090262 | A1 | 3/2019 | Yan |

FOREIGN PATENT DOCUMENTS

| CN | 107615681 A | 1/2018 |
| CN | 108377555 A | 8/2018 |

(Continued)

OTHER PUBLICATIONS

Doppler Compesation, Uplink Timing Advance, Random Access and UE Location in NTN; 3GPP TSG RAN WG1 Meeting #96bis R1-1904650 (Year: 2019).*

(Continued)

*Primary Examiner* — Melvin C Marcelo
*Assistant Examiner* — Natali Pascual Peguero

(57) ABSTRACT

The present disclosure provides a method and a device in a communication node used for wireless communications. A communication node receives first information and second information; and transmits a first radio signal, an SCS of a subcarrier occupied by the first radio signal is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment. The present disclosure improves scheduling flexibility.

20 Claims, 7 Drawing Sheets

(56) References Cited

FOREIGN PATENT DOCUMENTS

| | | | |
|---|---|---|---|
| CN | 108401298 | A | 8/2018 |
| CN | 108811075 | A | 11/2018 |
| CN | 109275185 | A | 1/2019 |
| CN | 109429354 | A | 3/2019 |
| CN | 109451845 | A | 3/2019 |
| CN | 109526002 | A | 3/2019 |
| EP | 3334234 | A1 | 6/2018 |
| WO | 2018059481 | A1 | 4/2018 |

OTHER PUBLICATIONS

ISR received in application No. PCT/CN2020/082319 dated Jun. 30, 2020.

CN201910345267.7 First Office Action dated Apr. 6, 2021.

CN201910345267.7 First Search Report dated Mar. 30, 2021.

CN201910345267.7 Notification to Grant Patent Right for Invention dated Oct. 11, 2021.

CN201910345267.7 Supplemental Search Report dated Sep. 28, 2021.

Nokia et aL Doppler Compensation , Uplink Timing Advance, Random Access and UE Location in NTN 3GPP TSG RAN WGI Meeting #96bis R1-1904650, Apr. 12, 2019 (Apr. 12, 2019).

3GPP. NR; Physical layer procedures for control(Release 15)3GPP TS 38.213 V15.5.0, Mar. 31, 2019 (Mar. 31, 2019).

Fraunhofer I1S et aL "Timing Advance Adjustments for Satellite Communications (NTN) "3GPP TSG RAN WG1 Meeting, RAN1#96bis R1-1904225, Apr. 12, 2019 (Apr. 12, 2019).

Zte et al. Discussion on the issues for UL scheduling in NTN3GPP TSG RAN WG1 #96bis R1-1904769, Apr. 12, 2019 (Apr. 12, 2019).

\* cited by examiner

| Frequency range and duplex mode | First timing offset (unit for measurement: $T_C$) |
|---|---|
| Frequency range1 FDD | 0 |
| Frequency range1 TDD | 39936 |
| Frequency range 2 | 13792 |

METHOD AND DEVICE IN COMMUNICATION NODE USED FOR WIRELESS COMMUNICATION

CROSS REFERENCE TO RELATED APPLICATIONS

This application is a continuation of the international patent application No. U.S. Ser. No. 17/509,092, filed on Oct. 25, 2021, which is a continuation of International Application No. PCT/CN2020/082319, filed Mar. 31, 2020, claims the priority benefit of Chinese Patent Application No. 201910345267.7, filed on Apr. 26, 2019, the full disclosure of which is incorporated herein by reference.

BACKGROUND

Technical Field

The present disclosure relates to transmission methods and devices in wireless communication systems, and in particular to a transmission scheme and device involving large delay.

Related Art

Application scenarios of future wireless communication systems are becoming increasingly diversified, and different application scenarios put forward different performance demands on systems. In order to meet different performance requirements of various application scenarios, it was decided at the 3rd Generation Partner Project (3GPP) Radio Access Network (RAN) #72th plenary that a study on New Radio (NR), or what is called Fifth Generation (5G) shall be conducted. The work item of NR was approved at the 3GPP RAN #75th plenary to standardize NR.

To ensure better adaptability to various application scenarios and requirements, the 3GPP RAN #75th plenary also approved a study item of NR-backed Non-Terrestrial Networks (NTN) starting with R15 version and started a WI to standardize relevant techniques in R16 or R17.

SUMMARY

In Non-Terrestrial Networks (NTN), a User Equipment (UE) is in communications with a satellite or an aircraft through 5G networks. Since a distance from the satellite or the aircraft to the UE is much longer than that from a terrestrial base station to the UE, there will be a long propagation delay in communications between the satellite or the aircraft and the UE. Besides, when the satellite is used as relay equipment for the terrestrial base station, a delay of a Feeder Link between the satellite and the terrestrial base station will result in a longer propagation delay between the UE and the base station. In the existing Long Term Evolution (LTE) or 5G NR systems, in order to ensure synchronization of uplink transmissions to avoid interferences between users and reduce scheduling complexity, a network device will configure a Timing Advance (TA) for uplink transmissions of the UE according to a propagation delay. Since the existing TA configurations, which cannot be directly applied to NTN networks, are all designed for traditional terrestrial communications, a new design is therefore needed for supporting large-delay networks, especially for NTN communications.

The disclosure provides a solution to the problem of uplink timing adjustment in large-delay networks, especially in NTN communications. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first communication node for wireless communications, comprising:
receiving first information and second information; and
transmitting a first radio signal, a subcarrier spacing (SCS) of a subcarrier occupied by the first radio signal in frequency domain being equal to a first SCS;
herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, integral and fractional part of TA are respectively configured during TA adjustment through the first sub-adjustment and the second sub-adjustment, which not only ensures the orthogonality of uplink transmissions, but also avoids the limitation of alignment of the uplink transmissions reaching a receiver, thus improving scheduling flexibility.

In one embodiment, by introducing the first sub-adjustment, the existing TA design in random access and TA adjustment signaling design during TA update or adjustment are reused to the greatest extent in large delay networks, thus reducing workload of standardization.

According to one aspect of the present disclosure, the above method is characterized in also comprising:
receiving a first signaling, the first signaling being used to determine a first time-domain resource;
herein, for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer.

In one embodiment, a number of OFDM symbols of long CP and a number of OFDM symbols of short CP comprised in a TA adjustment time length are determined according to a position of the first time-domain resource in time domain, which ensures the alignment of OFDM symbols after TA adjustment, so that a receiver can receive through a same FFT window to avoid multi-user interferences and reduce the complexity of the receiver.

According to one aspect of the present disclosure, the above method is characterized in that the second sub-adjustment is one of X candidate sub-adjustments, X being a positive integer greater than 1; the second information is used to determine the second sub-adjustment out of the X candidate sub-adjustments, or the second information is used to determine the X candidate sub-adjustments.

In one embodiment, the minimum granularity of adjustment during TA adjustment/update can be changed by adjusting the X candidate sub-adjustments, so as to satisfy different delay requirements; on the other hand, the UE can also be allowed to select the TA adjustment/update value by itself, so as to solve the problem of the TA update being not in time when the satellite moves at a high speed relative to the UE (such as LEO).

According to one aspect of the present disclosure, the above method is characterized in also comprising:
receiving third information; and
transmitting a first characteristic sequence;
herein, the third information is used to determine the first timing adjustment, or the third information is used to determine a transmission timing for the first characteristic sequence and the first timing adjustment; the first characteristic sequence is used for random access.

According to one aspect of the present disclosure, the above method is characterized in also comprising:
transmitting a second radio signal;
herein, the first timing adjustment is used to determine a transmission timing for the second radio signal, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal.

According to one aspect of the present disclosure, the above method in characterized in that a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

According to one aspect of the present disclosure, the above method is characterized in also comprising:
receiving a second signaling;
herein, the second signaling is used to determine the first SCS.

The present disclosure provides a method in a second communication node for wireless communications, comprising:
transmitting first information and second information; and
receiving a first radio signal, an SCS of a subcarrier occupied by the first radio signal in frequency domain being equal to a first SCS;
herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

According to one aspect of the present disclosure, the above method is characterized in also comprising:
transmitting a first signaling, the first signaling being used to determine a first time-domain resource;
herein, for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer.

According to one aspect of the present disclosure, the above method is characterized in that the second sub-adjustment is one of X candidate sub-adjustments, X being a positive integer greater than 1; the second information is used to determine the second sub-adjustment out of the X candidate sub-adjustments, or the second information is used to determine the X candidate sub-adjustments.

According to one aspect of the present disclosure, the above method is characterized in also comprising:
transmitting third information; and
receiving a first characteristic sequence;
herein, the third information is used to determine the first timing adjustment, or the third information is used to determine a transmission timing for the first characteristic sequence and the first timing adjustment; the first characteristic sequence is used for random access.

According to one aspect of the present disclosure, the above method is characterized in also comprising:
receiving a second radio signal;
herein, the first timing adjustment is used to determine a transmission timing for the second radio signal, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal.

According to one aspect of the present disclosure, the above method in characterized in that a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

According to one aspect of the present disclosure, the above method is characterized in also comprising:
transmitting a second signaling;
herein, the second signaling is used to determine the first SCS.

The present disclosure provides a first communication node for wireless communications, comprising:
a first receiver, receiving first information and second information; and a first transmitter, transmitting a first radio signal, an SCS of a subcarrier occupied by the first radio signal in frequency domain being equal to a first SCS;

herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

The present disclosure provides a second communication node for wireless communications, comprising:

a second transmitter, transmitting first information and second information; and a second receiver, receiving a first radio signal, an SCS of a subcarrier occupied by the first radio signal in frequency domain being equal to a first SCS;

herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, compared with TA adjustment method in the existing terrestrial networks, the present disclosure has the following main technical advantages:

In large delay networks (such as NTN), due to the large transmission delay gap, a large amount of TA signaling overhead is required to ensure the synchronization of uplink transmissions. The method in the present disclosure removes the limitation of alignment of uplink transmissions reaching receivers while ensuring the orthogonality of uplink transmissions by dividing TA adjustment/update into an integral part and a decimal part, the base station can adjust an integral symbol for uplink transmission timing according to implementation needs, thus improving the scheduling flexibility.

The method in the present disclosure enables that the existing TA design in random access and TA adjustment signaling design during TA update or adjustment are reused to the greatest extent in the large delay network, thus reducing the workload of standardization.

The method in the present disclosure fully considers the influence of OFDM symbols of long CP and OFDM symbols of short CP in a subframe on TA adjustment performed on integral bit, which ensures the alignment of OFDM symbols after TA adjustment, so that the receiver can receive through a same FFT window, thus avoiding multi-user interferences and reducing the complexity of the receiver.

The method in the present disclosure enables that the minimum granularity of adjustment during TA adjustment/update can be changed, so as to satisfy different delay requirements; on the other hand, the UE can also be allowed to select the TA adjustment/update value by itself, so as to solve the problem of the TA update being not in time when the satellite moves at a high speed relative to the UE (such as LEO).

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
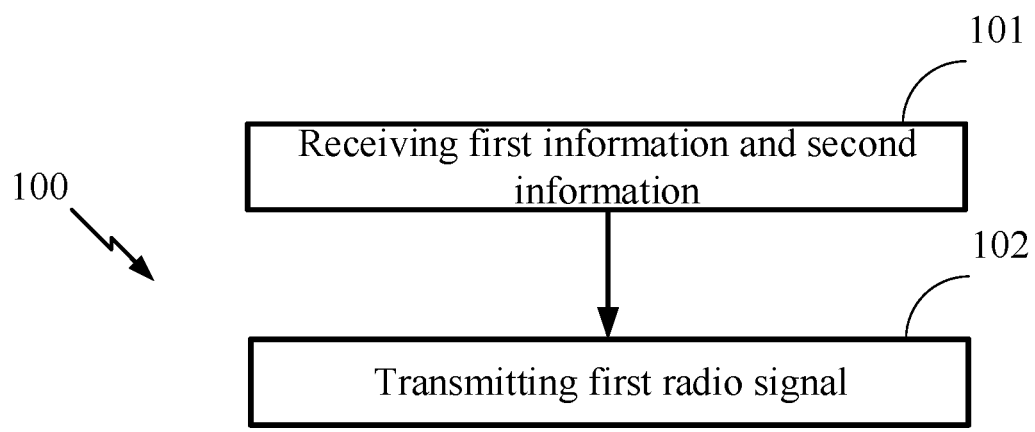
FIG. 1 illustrates a flowchart of first information, second information and a first radio signal according to one embodiment of the present disclosure.

Embodiment 1 illustrates a flowchart of transmission of first information, second information, and a first radio signal according to one embodiment of the present disclosure, as shown in FIG. 1. In FIG. 1, each box represents a step. Particularly, the sequential order of steps in these boxes does not necessarily mean that the steps are chronologically arranged. In embodiment 1, a first communication node in the present disclosure receives first information and second information; transmits a first radio signal, an SCS of a subcarrier occupied by the first radio signal in frequency domain is equal to a first SCS; herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the first information is transmitted via a higher-layer signaling.

In one embodiment, the first information is transmitted via a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IEs) in a Radio Resource Control (RRC) signaling.

In one embodiment, the first information comprises all or partial fields in an IE in a RRC signaling.

In one embodiment, the first information comprises all or partial fields in a Medium Access Control (MAC) layer signaling.

In one embodiment, the first information comprises all or part of a MAC Control Element (CE).

In one embodiment, the first information comprises all or part of a MAC Header.

In one embodiment, the first information comprises all or part of a Random Access Response (RAR) MAC payload.

In one embodiment, the first information comprises all or part of Msg2 in random access procedure.

In one embodiment, the first information comprises all or part of MsgB in random access procedure.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is unicast.

In one embodiment, the first information is Cell-Specific.

In one embodiment, the first information is UE-specific.

In one embodiment, the first information is UE group-specific.

In one embodiment, the first information is transmitted through a Physical Downlink Control Channel (PDCCH).

In one embodiment, the first information comprises all or partial fields of a Downlink Control Information (DCI) signaling.

In one embodiment, the phrase of "the first information being used to determine the first sub-adjustment" includes: the first information is used by the first communication node to determine the first sub-adjustment.

In one embodiment, the phrase of "the first information being used to determine the first sub-adjustment" includes: the first information directly indicates the first sub-adjustment.

In one embodiment, the phrase of "the first information being used to determine the first sub-adjustment" includes: the first information indirectly indicates the first sub-adjustment.

In one embodiment, the phrase of "the first information being used to determine the first sub-adjustment" includes: the first information explicitly indicates the first sub-adjustment.

In one embodiment, the phrase of "the first information being used to determine the first sub-adjustment" includes: the first information implicitly indicates the first sub-adjustment.

In one embodiment, the first information is transmitted via an air interface.

In one embodiment, the first information is transmitted via a radio interface.

In one embodiment, the first information is transmitted via an interface between a second communication node and the first communication node in the present disclosure.

In one embodiment, the first information is transmitted via a Uu interface.

In one embodiment, the second information is the first information in the present disclosure.

In one embodiment, the second information is one piece of information other than the first information in the present disclosure.

In one embodiment, the second information is the same as the first information in the present disclosure.

In one embodiment, the second information is different from the first information in the present disclosure.

In one embodiment, the first information and second information in the present disclosure are transmitted via a same signaling.

In one embodiment, the first information and second information in the present disclosure are transmitted via a same RRC signaling.

In one embodiment, the first information and second information in the present disclosure are transmitted via different signalings.

In one embodiment, the first information and the second information in the present disclosure are transmitted through a same PDSCH.

In one embodiment, the first information and the second information in the present disclosure are transmitted through two different PDSCHs.

In one embodiment, the first information and the second information are transmitted via a same signaling after subjected to joint coding.

In one embodiment, the first information and the second information in the present disclosure are transmitted as a same field in a same signaling after subjected to joint coding.

In one embodiment, the first information and the second information are transmitted as two different fields in a same signaling.

In one embodiment, the first information and the second information in the present disclosure are transmitted as a same IE in a same RRC signaling after subjected to joint coding.

In one embodiment, the first information and the second information in the present disclosure are transmitted as two different IEs in a same RRC signaling.

In one embodiment, the first information and the second information in the present disclosure are transmitted as two different Control Elements (CEs) in a same MAC signaling.

In one embodiment, the first information and the second information in the present disclosure are transmitted as two fields in a same CE in a same MAC signaling after subjected to joint coding.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information comprises all or partial Information Elements (IE) in an RRC signaling.

In one embodiment, the second information comprises all or partial fields in an IE in a RRC signaling.

In one embodiment, the second information comprises all or partial fields of a CE in a MAC-layer signaling.

In one embodiment, the second information comprises all or part of an RAR MAC payload.

In one embodiment, the second information comprises all or part of Msg2 in random access procedure.

In one embodiment, the second information comprises all or part of MsgB in random access procedure.

In one embodiment, the second information is transmitted through a DL-SCH.

In one embodiment, the second information is transmitted through a PDSCH.

In one embodiment, the second information is broadcast.

In one embodiment, the second information is unicast.

In one embodiment, the second information is Cell-Specific.

In one embodiment, the second information is UE-specific.

In one embodiment, the second information is transmitted through a PDCCH.

In one embodiment, the second information comprises all or partial fields of a DCI signaling.

In one embodiment, the phrase of "the second information being used to determine the second sub-adjustment" includes: the second information is used by the first communication node to determine the second sub-adjustment.

In one embodiment, the phrase of "the second information being used to determine the second sub-adjustment" includes: the second information directly indicates the second sub-adjustment.

In one embodiment, the phrase of "the second information being used to determine the second sub-adjustment" includes: the second information indirectly indicates the second sub-adjustment.

In one embodiment, the phrase of "the second information being used to determine the second sub-adjustment" includes: the second information explicitly indicates the second sub-adjustment.

In one embodiment, the phrase of "the second information being used to determine the second sub-adjustment" includes: the second information implicitly indicates the second sub-adjustment.

In one embodiment, the second information is transmitted via an air interface.

In one embodiment, the second information is transmitted via a radio interface.

In one embodiment, the second information is transmitted via an interface between a second communication node and the first communication node in the present disclosure.

In one embodiment, the second information is transmitted via a Uu interface.

In one embodiment, the first information and the second information are used for updating a TA of uplink transmissions of the first communication node.

In one embodiment, the first information and the second information are used for adjusting a TA of uplink transmissions of the first communication node.

In one embodiment, the first radio signal carries Msg3 (random access information 3).

In one embodiment, the first radio signal is used for a random access procedure.

In one embodiment, the first radio signal carries a retransmission of Msg3.

In one embodiment, the first radio signal carries a first transmission of Msg3.

In one embodiment, the first radio signal carries a retransmission of MsgB.

In one embodiment, the first radio signal carries a first transmission of MsgB.

In one embodiment, the first radio signal is an uplink transmission of the first communication node in RRC_CONNECTED state.

In one embodiment, the first radio signal is an uplink transmission later than Msg3.

In one embodiment, the first radio signal is an uplink transmission of the first communication node after a random access procedure is completed.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is transmitted through a Physical Uplink Control Channel (PUCCH).

In one embodiment, the first radio signal is transmitted via a Sounding Reference Signal (SRS).

In one embodiment, the first radio signal is transmitted via an Uplink Demodulation Reference Signal (UL DMRS).

In one embodiment, the first radio signal occupies at least one subcarrier in frequency domain.

In one embodiment, the first radio signal occupies more than one subcarrier infrequency domain, and SCSs of any two subcarriers occupied by the first radio signal in frequency domain are equal.

In one embodiment, the first SCS is equal to one of 15 kHz, 30 kHz, 60 kHz, 120 kHz or 240 kHz.

In one embodiment, the first timing adjustment and the second timing adjustment are both real numbers.

In one embodiment, units for measurement of the first timing adjustment and the second timing adjustment are both ps.

In one embodiment, units for measurement of the first timing adjustment and the second timing adjustment are both second.

In one embodiment, the first timing adjustment is positive or the first timing adjustment is equal to 0.

In one embodiment, the first timing adjustment is negative or the first timing adjustment is equal to 0.

In one embodiment, the second timing adjustment is positive or the second timing adjustment is equal to 0.

In one embodiment, the second timing adjustment is negative or the second timing adjustment is equal to 0.

In one embodiment, the first timing adjustment amount is equal to an integral number of $T_c$, where $T_c=1/(480 \cdot 10^3 \cdot 4096)$ second.

In one embodiment, the second timing adjustment amount is equal to an integral number of $T_c$, where $T_c=1/(480 \cdot 10^3 \cdot 4096)$ second.

In one embodiment, a minimum adjustment step-size of the first timing adjustment is not equal to a minimum adjustment step-size of the second timing adjustment.

In one embodiment, a minimum adjustment step-size of the first timing adjustment is equal to a minimum adjustment step-size of the second timing adjustment.

In one embodiment, a minimum adjustment step-size of the first timing adjustment is less than a minimum adjustment step-size of the second timing adjustment.

In one embodiment, a minimum adjustment step-size of the first timing adjustment is greater than a minimum adjustment step-size of the second timing adjustment.

In one embodiment, the first timing adjustment is related to a type of the second communication node in the present disclosure.

In one embodiment, the first timing adjustment is related to a height of the second communication node in the present disclosure.

In one embodiment, the first timing adjustment is related to a type of a satellite to which the second communication node in the present disclosure belongs.

In one embodiment, the first timing adjustment is a TA maintained by the first communication node before transmitting the first radio signal.

In one embodiment, the first timing adjustment is an Old TA before transmitting the first radio signal.

In one embodiment, the first timing adjustment amount is equal to $N_{TA\_old} \cdot T_c$, where $T_c=1/(480 \cdot 10^3 \cdot 4096)$ second.

In one embodiment, the second timing adjustment is an adjustment value to TA based on the first timing adjustment when transmitting the first radio signal.

In one embodiment, the above phrase of "a sum of a first timing adjustment and a second timing adjustment being used to determine a transmission timing for the first radio signal" includes: a sum of the first timing adjustment and the second timing adjustment is used by the first communication node in the present disclosure to determine a transmission timing for the first radio signal.

In one embodiment, the above phrase of "a sum of a first timing adjustment and a second timing adjustment being used to determine a transmission timing for the first radio signal" includes: a sum of the first timing adjustment and the second timing adjustment is used to determine a TA of the first radio signal.

In one embodiment, the above phrase of "a sum of a first timing adjustment and a second timing adjustment being used to determine a transmission timing for the first radio signal" includes: a sum of the first timing adjustment and the second timing adjustment is equal to a TA of the first radio signal.

In one embodiment, the above phrase of "the first timing adjustment being used to determine a transmission timing for a radio signal transmitted earlier than the first radio signal" includes: the first timing adjustment is used to determine a transmission timing for a virtual radio signal transmitted earlier than the first radio signal.

In one embodiment, the above phrase of "the first timing adjustment being used to determine a transmission timing for a radio signal transmitted earlier than the first radio signal" includes: the first timing adjustment is used to determine a transmission timing for an actual radio signal transmitted earlier than the first radio signal.

In one embodiment, the above phrase of "the first timing adjustment being used to determine a transmission timing of a radio signal transmitted earlier than the first radio signal" includes: when there exists a radio signal transmitted earlier than the first radio signal, the first timing adjustment can be used to determine a transmission timing for a radio signal transmitted earlier than the first radio signal.

In one embodiment, the above phrase of "the first timing adjustment being used to determine a transmission timing of a radio signal transmitted earlier than the first radio signal" includes: the first communication node in the present disclosure may assume that the first timing adjustment is used to determine a transmission timing for a radio signal transmitted earlier than the first radio signal.

In one embodiment, the above phrase of "the first timing adjustment being used to determine a transmission timing of a radio signal transmitted earlier than the first radio signal" includes: the first timing adjustment is used by the first communication node in the present disclosure to determine a transmission timing for a radio signal transmitted earlier than the first radio signal.

In one embodiment, the above phrase of "the first timing adjustment being used to determine a transmission timing for a radio signal transmitted earlier than the first radio signal" includes: the first timing adjustment is used to determine a TA of a radio signal transmitted earlier than the first radio signal.

In one embodiment, the above phrase of "the first timing adjustment being used to determine a transmission timing for a radio signal transmitted earlier than the first radio signal" includes: the first timing adjustment is equal to a TA of a radio signal transmitted earlier than the first radio signal.

In one embodiment, the above phrase of "the first timing adjustment being used to determine a transmission timing for a radio signal transmitted earlier than the first radio signal" includes: the first timing adjustment is used to determine a transmission timing for a Physical Random Access Channel (PRACH).

In one embodiment, the above phrase of "the first timing adjustment being used to determine a transmission timing of a radio signal transmitted earlier than the first radio signal" includes: the first timing adjustment is used to determine a transmission timing for MsgA.

In one embodiment, the first sub-adjustment and the second sub-adjustment are both real numbers.

In one embodiment, the first sub-adjustment and the second sub-adjustment are both measured by ps.

In one embodiment, the first sub-adjustment and the second sub-adjustment are both measured by second.

In one embodiment, the first sub-adjustment is a positive number.

In one embodiment, the first sub-adjustment is a negative number.

In one embodiment, the second sub-adjustment is a positive integer or the second sub-adjustment is equal to 0.

In one embodiment, the second sub-adjustment is a negative integer or the second sub-adjustment is equal to 0.

In one embodiment, the first sub-adjustment is equal to an integral number of $T_c$, where $T_c=1/(480 \cdot 10^3 \cdot 4096)$ second.

In one embodiment, the second sub-adjustment is equal to an integral number of $T_c$, where $T_c=1/(480 \cdot 10^3 \cdot 4096)$ second.

In one embodiment, the multicarrier symbol is an Orthogonal Frequency Division Multiplexing (OFDM) symbol.

In one embodiment, the multicarrier symbol is a Discrete Fourier Transform-Spread-Orthogonal Frequency Division Multiplexing (DFT-s-OFDM) symbol.

In one embodiment, the multicarrier symbol is a Single Carrier Frequency Division Multiplexing Access (SC-FDMA) symbol.

In one embodiment, the multicarrier symbol comprises a Cyclic Prefix (CP) and a data symbol part.

In one embodiment, an absolute of the first sub-adjustment is equal to a time length occupied by at least one slot.

In one embodiment, an absolute of the first sub-adjustment is equal to a time length occupied by at least one half-slot.

In one embodiment, the minimum step-size corresponding to the second sub-adjustment is a minimum granularity when adjusting the second sub-adjustment.

In one embodiment, the minimum step-size corresponding to the second sub-adjustment is a minimum granularity when configuring the second sub-adjustment.

In one embodiment, the minimum step-size corresponding to the second sub-adjustment is a minimum step-size when configuring the second sub-adjustment.

In one embodiment, the above phrase of "a minimum step-size corresponding to the second sub-adjustment being less than a time length occupied by a multicarrier symbol" includes: a minimum step-size corresponding to the second sub-adjustment is less than a time length occupied by any multicarrier symbol in the system.

In one embodiment, the above phrase of "a minimum step-size corresponding to the second sub-adjustment being less than a time length occupied by a multicarrier symbol" includes: a minimum step-size corresponding to the second sub-adjustment is less than a time length occupied by a multicarrier symbol with a minimum length in the system.

Embodiment 2

Figure 2:
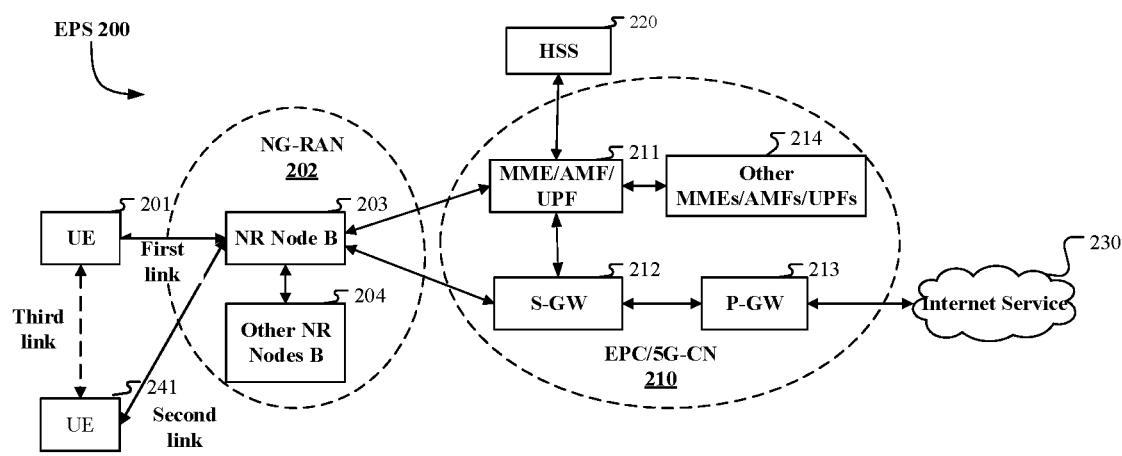
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may also be referred as a base station, a base transceiver, a radio base station, a radio transceiver, a transceiver function, a Basic Service Set (BSS), an Extended Service Set (ESS), a Transmission and Reception Point (TRP), or some other suitable terms. In a NTN network, gNB 203 may be a satellite or a territorial base station relayed through a satellite. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet and IP Multimedia Subsystem (IMS).

In one embodiment, the UE 201 corresponds to the first communication node in the present disclosure.

In one embodiment, the UE 201 supports NTN communications.

In one embodiment, the UE 201 supports communications within networks with large delay differences.

In one embodiment, the gNB 203 corresponds to the second communication node in the present disclosure.

In one embodiment, the gNB 203 supports NTN communications.

In one embodiment, the gNB 203 supports communications within networks with large delay differences.

Embodiment 3

Figure 3:
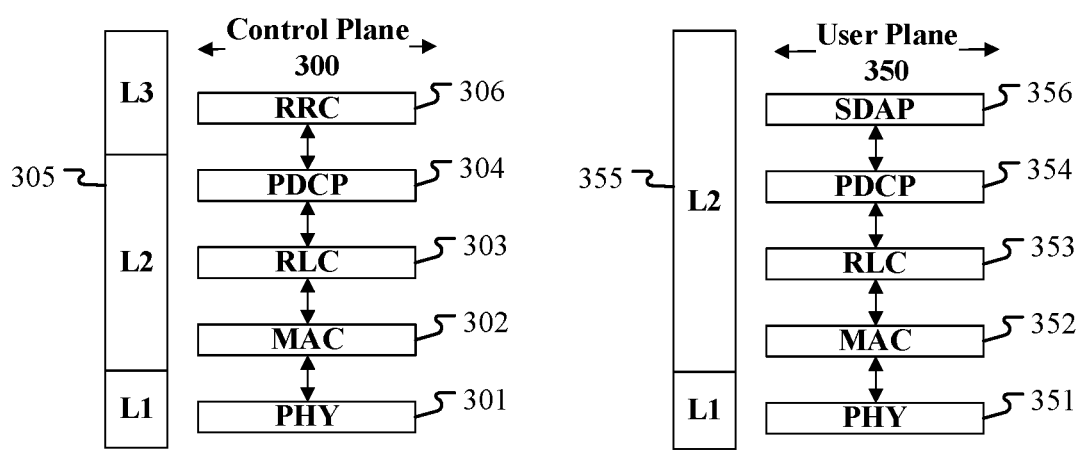
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or a satellite or an aircraft in NTN) and a second communication node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a MAC sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the first radio signal in the present disclosure is generated by the RRC 306.

In one embodiment, the first radio signal in the present disclosure is generated by the MAC 302 or the MAC 352.

In one embodiment, the first radio signal in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the first characteristic sequence in the present disclosure is generated by the RRC 306.

In one embodiment, the first characteristic sequence in the present disclosure is generated by the MAC 302 or the MAC 352.

In one embodiment, the first characteristic sequence in the present disclosure is generated by the PHY 301 or the PHY 351.

In one embodiment, the second radio signal in the present disclosure is generated by the RRC 306.

In one embodiment, the second radio signal in the present disclosure is generated by the MAC 302 or the MAC 352.

In one embodiment, the second radio signal in the present disclosure is generated by the PHY 301 or the PHY 351.

In one embodiment, the second signaling in the present disclosure is generated by the RRC 306.

In one embodiment, the second signaling in the present disclosure is generated by the MAC 302 or the MAC 352.

In one embodiment, the second signaling in the present disclosure is generated by the PHY 301 or the PHY 351.

Embodiment 4

Figure 4:
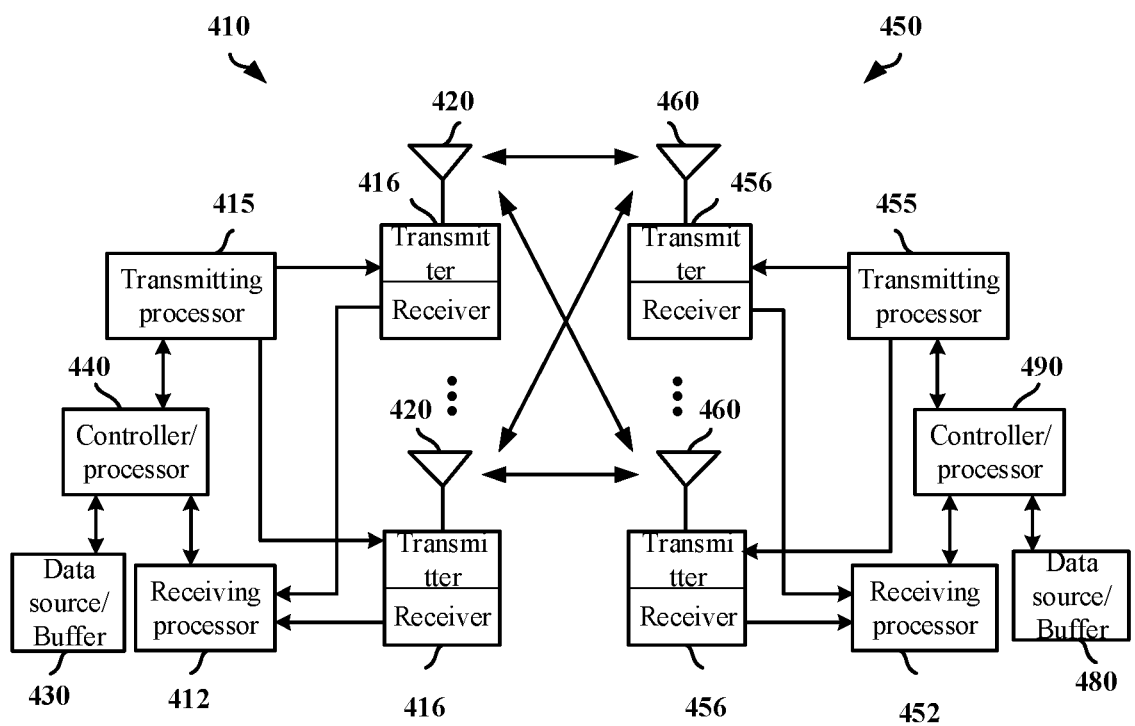
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (450) may comprise a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher-layer packet to the controller/processor 490, the controller/processor 490 provides header compression and decompression, encryption and decryption, packet segmentation and reordering and multiplexing and demultiplexing between a logical channel and a transport channel so as to implement protocols of the L2 layer and above the L2 layer used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, deprecoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second communication node (410) may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher layer packet to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH or SL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulation, deprecoding and extraction of physical layer signaling. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink, a higher-layer packet, such as high-layer information comprised in first information, second information, third information, a first signaling and a second signaling in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first communication node 450 based on varied priorities. The controller/processor 440 is also in charge of HARQ operation, retransmission of a lost packet, and a signaling to the first communication node 450, for instance, higher-layer information comprised in the first information, the second information, the third information, the first signaling and the second signaling (if comprised) in the present disclosure are all generated in the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of physical-layer signals of the first information, the second information, the third information, the first signaling and the second signaling in the present disclosure are completed by the transmitting processor 415, and the transmitting processor 415 divides the generated modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals of the first information, the second information, the third information, the first signaling and the second signaling of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second communication node 410 on a physical channel, and the data or control signals are later provided to the controller/processor 490. The controller/processor 490 implements the function of L2 layer and above layers, and the controller/processor 490 interprets higher-layer information comprised in the first information, the second information, the third information, the first signaling and the second signaling (if higher-layer information is comprised) in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second communication node 410. The controller/processor 490 is also in charge of HARQ operation, retransmission of a lost packet, and a signaling to the second communication node 410. The first radio signal and the second radio signal in the present disclosure are generated at the data source/buffer 480 or at the controller/processor 490. The transmitting processor 455 implements various signal transmitting and processing functions used for Li layer (i.e., PHY), the physical layer signal of the first radio signal in the present disclosure and the first characteristic sequence are generated by the transmitting processor 455, and applications of the first timing adjustment, the second timing adjustment and the third timing adjustment in the present disclosure are implemented by the transmitting processor 455. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the first radio signal and the second radio signal in the present disclosure and the first characteristic sequence, the signal receiving and processing function includes acquisition of multi-carrier symbol streams, demodulation based on each modulation scheme (i.e., BPSK, QPSK), then the decoding and de-interleaving to recover data and/or control signals originally transmitted by the first communication node 450 on the PHY. The data and the control signal are then provided to the controller/processor 440. The controller/processor 440 performs functions of L2 layer, including information interpretation carried by the first radio signal in the present disclosure. The controller/ processor can be connected to a buffer 430 that stores program code and data. The buffer 430 may be called a computer readable medium.

In one embodiment, the first communication node 450 comprises at least one processor and at least one memory. The at least one memory comprises computer program codes; the at least one memory and the computer program codes are configured to be used in collaboration with the at least one processor, the first communication node 450 at least receives first information and second information; and transmits a first radio signal, an SCS of a subcarrier occupied by the first radio signal in frequency domain is equal to a first SCS; herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the first communication node 450 comprises a memory that stores a computer readable instruction program. The computer readable instruction program generates an action when executed by at least one processor. The action includes: receiving first information and second information; and transmitting a first radio signal, an SCS of a subcarrier occupied by the first radio signal in frequency domain being equal to a first SCS; herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the second communication node 410 comprises at least one processor and at least one memory. The at least one memory comprises computer program codes; the at least one memory and the computer program codes are configured to be used in collaboration with the at least one processor. The second communication node 410 at least: transmits first information and second information; and receives a first radio signal, an SCS of a subcarrier occupied by the first radio signal in frequency domain is equal to a first SCS; herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the second communication node 410 comprises a memory that stores a computer readable instruction program. The computer readable instruction program generates an action when executed by at least one processor. The action includes: transmitting first information and second information; and receiving a first radio signal, an SCS of a subcarrier occupied by the first radio signal in frequency domain being equal to a first SCS; herein, a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the first communication node 450 is a UE.

In one embodiment, the first communication node 450 is a UE supporting large delay differences.

In one embodiment, the first communication node 450 is a UE supporting NTN.

In one embodiment, the first communication node 450 is an aircraft device.

In one embodiment, the second communication node 410 is a base station (gNB/eNB).

In one embodiment, the second communication node 410 is a base station supporting large delay differences.

In one embodiment, the second communication node 410 is a base station supporting NTN.

In one embodiment, the second communication node 410 is a satellite equipment.

In one embodiment, the second communication node 410 is flying platform equipment.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the third information in the present disclosure.

In one embodiment, the receiver 456 (including the antenna 460), the receiving processor 452 and the controller/processor 490 are used to receive the first signaling in the present disclosure.

In one embodiment, the receiver 456 (including the antenna 460), the receiving processor 452 and the controller/processor 490 are used to receive the second signaling in the present disclosure.

In one embodiment, the transmitter 456 (including the antenna 460), the transmitting processor 455 and the controller/processor 490 are used to transmit the first radio signal in the present disclosure.

In one embodiment, the transmitter 456 (including the antenna 460), the transmitting processor 455 and the controller/processor 490 are used to transmit the second radio signal in the present disclosure.

In one embodiment, the transmitter 456 (including the antenna 460), the transmitting processor 455 and the controller/processor 490 are used to transmit the first characteristic sequence in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the third information in the present disclosure.

In one embodiment, the transmitter 416 (including the antenna 420), the transmitting processor 415 and the controller/processor 440 are used to transmit the first signaling in the present disclosure.

In one embodiment, the transmitter 416 (including the antenna 420), the transmitting processor 415 and the controller/processor 440 are used to transmit the second signaling in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420), the receiving processor 412 and the controller/processor 440 are used to receive the second radio signal in the present disclosure.

In one embodiment, the receiver 416 (including the antenna 420), the receiving processor 412 and the controller/processor 440 are used to receive the first characteristic sequence in the present disclosure.

Embodiment 5

Figure 5:
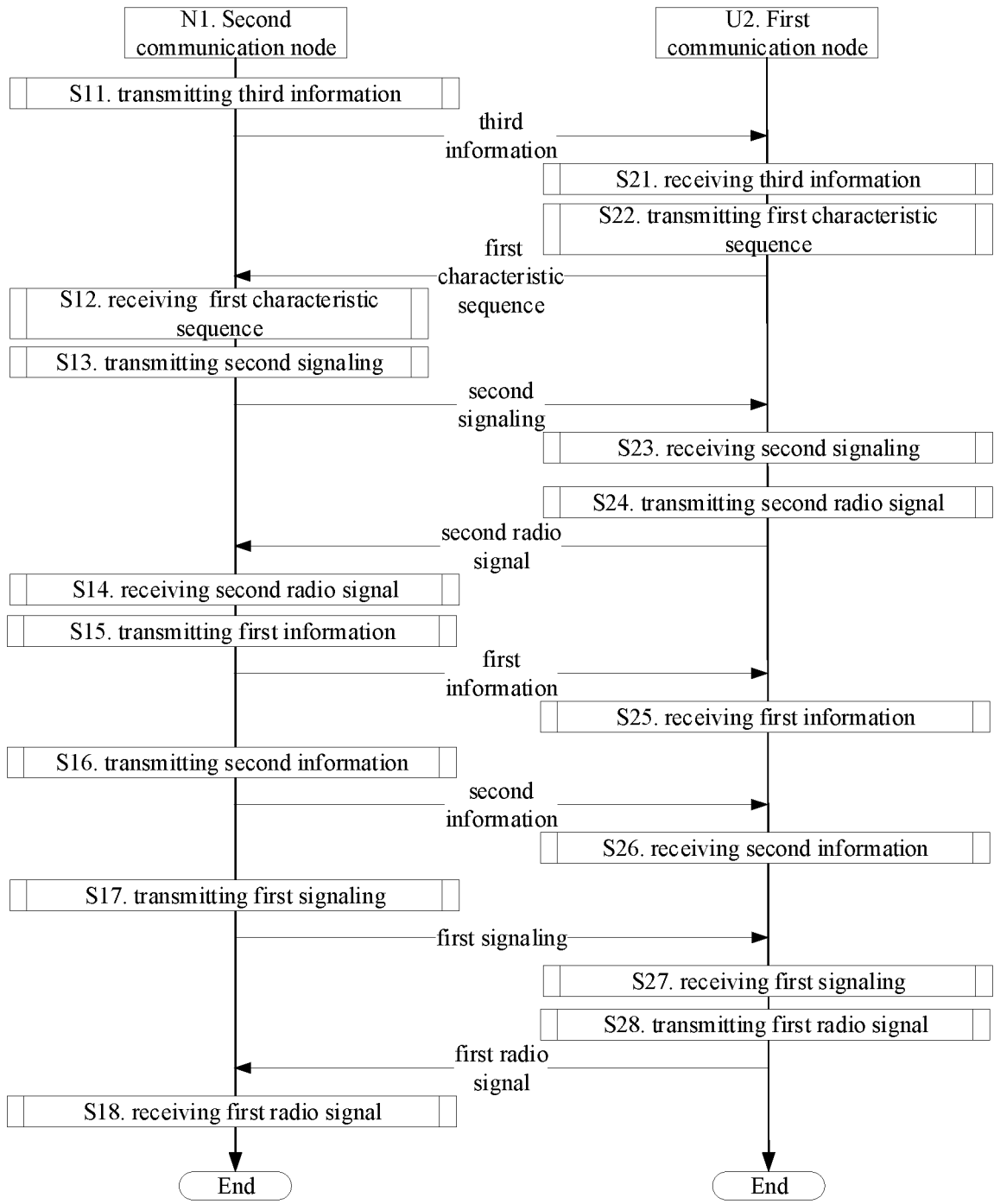
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second communication node N1 is a maintenance base station of a serving cell of a first communication node U2. It is particularly underlined that the order illustrated in the embodiment does not put constraints over sequences of signal transmissions and implementations.

The second communication node N1 transmits third information in step S11, receives a first characteristic sequence in step S12, transmits a second signaling in step S13, receives a second radio signal in step S14, transmits first information in step S15, transmits second information in step S16, transmits a first signaling in step S17, and receives a first radio signal in step S18.

The first communication node U2 receives third information in step S21, transmits a first characteristic sequence in step S22, receives a second signaling in step S23, transmits a second radio signal in step S24, receives first information in step S25, receives second information in step S26, receives a first signaling in step S27, and transmits a first radio signal in step S28.

In embodiment 5, an SCS of a subcarrier occupied by the first radio signal in the present disclosure in frequency domain is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one a multicarrier symbol; the first signaling is used to determine a first time-domain resource; for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer; the third information is used to determine the first timing adjustment, or the third information is used to determine a transmission timing for the first characteristic sequence and the first timing adjustment; the first characteristic sequence is used for random access; the first timing adjustment is used to determine a transmission timing for the second radio signal, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal; the second signaling is used to determine the first SCS.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information comprises all or partial IEs in an RRC signaling.

In one embodiment, the third information comprises all or partial fields in an IE in an RRC signaling.

In one embodiment, the third information comprises all or partial fields in a MAC layer signaling.

In one embodiment, the third information comprises all or part of a MAC Control Element (CE).

In one embodiment, the third information comprises all or part of a MAC Header.

In one embodiment, the third information comprises all or part of an RAR MAC payload.

In one embodiment, the third information comprises all or part of Msg2 in random access procedure.

In one embodiment, the third information comprises all or part of MsgB in random access procedure.

In one embodiment, the third information is transmitted through a DL-SCH.

In one embodiment, the third information is transmitted through a PDSCH.

In one embodiment, the third information comprises all or part of a System Information Block (SIB).

In one embodiment, the third information is broadcast.

In one embodiment, the third information is unicast.

In one embodiment, the third information is Cell-Specific.

In one embodiment, the third information is UE-specific.

In one embodiment, the third information is UE group-specific.

In one embodiment, the third information is transmitted through a PDCCH.

In one embodiment, the third information comprises all or partial fields of a DCI signaling.

In one embodiment, the first characteristic sequence is a preamble.

In one embodiment, the first characteristic sequence is used to generate a Physical Random Access Channel (PRACH).

In one embodiment, the first characteristic sequence is used to carry Msg1 in random access procedure.

In one embodiment, the first characteristic sequence is used to carry MsgA in a random access procedure.

In one embodiment, the first characteristic sequence is a preamble sequence in MsgA in a random access procedure.

In one embodiment, the first characteristic sequence consists of all or partial elements of a Zadoff-Chu (ZC) sequence.

In one embodiment, the first characteristic sequence is obtained after a ZC sequence subjected to cyclic expansion.

In one embodiment, the first characteristic sequence is generated by a ZC sequence with a length equal to 839.

In one embodiment, the first characteristic sequence is generated by a ZC sequence with a length equal to 139.

In one embodiment, the phrase of "the third information being used to determine the first timing adjustment" includes: the third information is used by the first communication node to determine the first timing adjustment.

In one embodiment, the phrase of "the third information being used to determine the first timing adjustment" includes: the third information is used to directly indicate the first timing adjustment.

In one embodiment, the phrase of "the third information being used to determine the first timing adjustment" includes: the third information is used to indirectly indicate the first timing adjustment.

In one embodiment, the phrase of "the third information being used to determine the first timing adjustment" includes: the third information is used to explicitly indicate the first timing adjustment.

In one embodiment, the phrase of "the third information being used to determine the first timing adjustment" includes: the third information is used to implicitly indicate the first timing adjustment.

In one embodiment, the third information comprises a TA command in an RAR.

In one embodiment, the above phrase of "the third information being used to determine a transmission timing for the first characteristic sequence and the first timing adjustment" includes: the third information is used by the first communication node to determine a transmission timing for the first characteristic sequence and the first timing adjustment.

In one embodiment, the above phrase of "the third information being used to determine a transmission timing for the first characteristic sequence and the first timing adjustment" includes: the third information is used to directly indicate a transmission timing for the first characteristic sequence and the first timing adjustment.

In one embodiment, the above phrase of "the third information being used to determine a transmission timing for the first characteristic sequence and the first timing adjustment" includes: the third information is used to indirectly indicate a transmission timing for the first characteristic sequence and the first timing adjustment.

In one embodiment, the above phrase of "the third information being used to determine a transmission timing for the first characteristic sequence and the first timing adjustment" includes: the third information is used to explicitly indicate a transmission timing for the first characteristic sequence and the first timing adjustment.

In one embodiment, the above phrase of "the third information being used to determine a transmission timing for the first characteristic sequence and the first timing adjustment" includes: the third information is used to implicitly indicate a transmission timing for the first characteristic sequence and the first timing adjustment.

In one embodiment, the above phrase of "the third information being used to determine a transmission timing for the first characteristic sequence and the first timing adjustment" includes: the third information is used to determine a start slot for transmitting the first characteristic sequence, and the third information is used to indicate the first timing adjustment.

In one embodiment, the above phrase of "the third information being used to determine a transmission timing for the first characteristic sequence and the first timing adjustment" includes: the third information indicates a common time offset, the common time offset is equal to a TA for transmitting the first characteristic sequence, and a sum of the common time offset and a TA indicated in an RAR is equal to the first timing adjustment.

In one embodiment, the above phrase of "the third information being used to determine a transmission timing for the first characteristic sequence and the first timing adjustment" includes: the third information indicates a common time offset, the common time offset is equal to a TA for transmitting the first characteristic sequence, and a sum of the common time offset and a TA indicated in an RAR is equal to the first timing adjustment; for the first SCS, the common time offset is equal to at least one slot time length.

In one embodiment, the first timing adjustment is used to determine a transmission timing for the first characteristic sequence.

In one embodiment, a transmission timing for the first characteristic sequence is unrelated to the first timing adjustment.

In one embodiment, the first signaling is a higher-layer signaling.

In one embodiment, the first signaling is a physical-layer signaling.

In one embodiment, the first signaling is transmitted through a PDCCH.

In one embodiment, the first signaling is transmitted through a PDSCH.

In one embodiment, the first signaling carries all or partial fields in one piece of DCI.

In one embodiment, the first signaling comprises an uplink grant.

In one embodiment, the first signaling is used to schedule Msg3.

In one embodiment, the first signaling is used to schedule retransmitting Msg3.

In one embodiment, the first signaling is used to schedule a PUSCH.

In one embodiment, the first signaling is used to configure a PUCCH.

In one embodiment, the first signaling is used to configure an SCS.

In one embodiment, the first signaling is used to configure an Uplink DMRS.

In one embodiment, the above phrase of "the first signaling being used to determine a first time-domain resource" includes: the first signaling is used by the first communication node in the present disclosure to determine the first time-domain resource.

In one embodiment, the above phrase of "the first signaling being used to determine a first time-domain resource" includes: the first signaling directly indicates the first time-domain resource.

In one embodiment, the above phrase of "the first signaling being used to determine a first time-domain resource" includes: the first signaling indirectly indicates the first time-domain resource.

In one embodiment, the above phrase of "the first signaling being used to determine a first time-domain resource" includes: the first signaling explicitly indicates the first time-domain resource.

In one embodiment, the above phrase of "the first signaling being used to determine a first time-domain resource" includes: the first signaling implicitly indicates the first time-domain resource.

Embodiment 6

Figure 6:
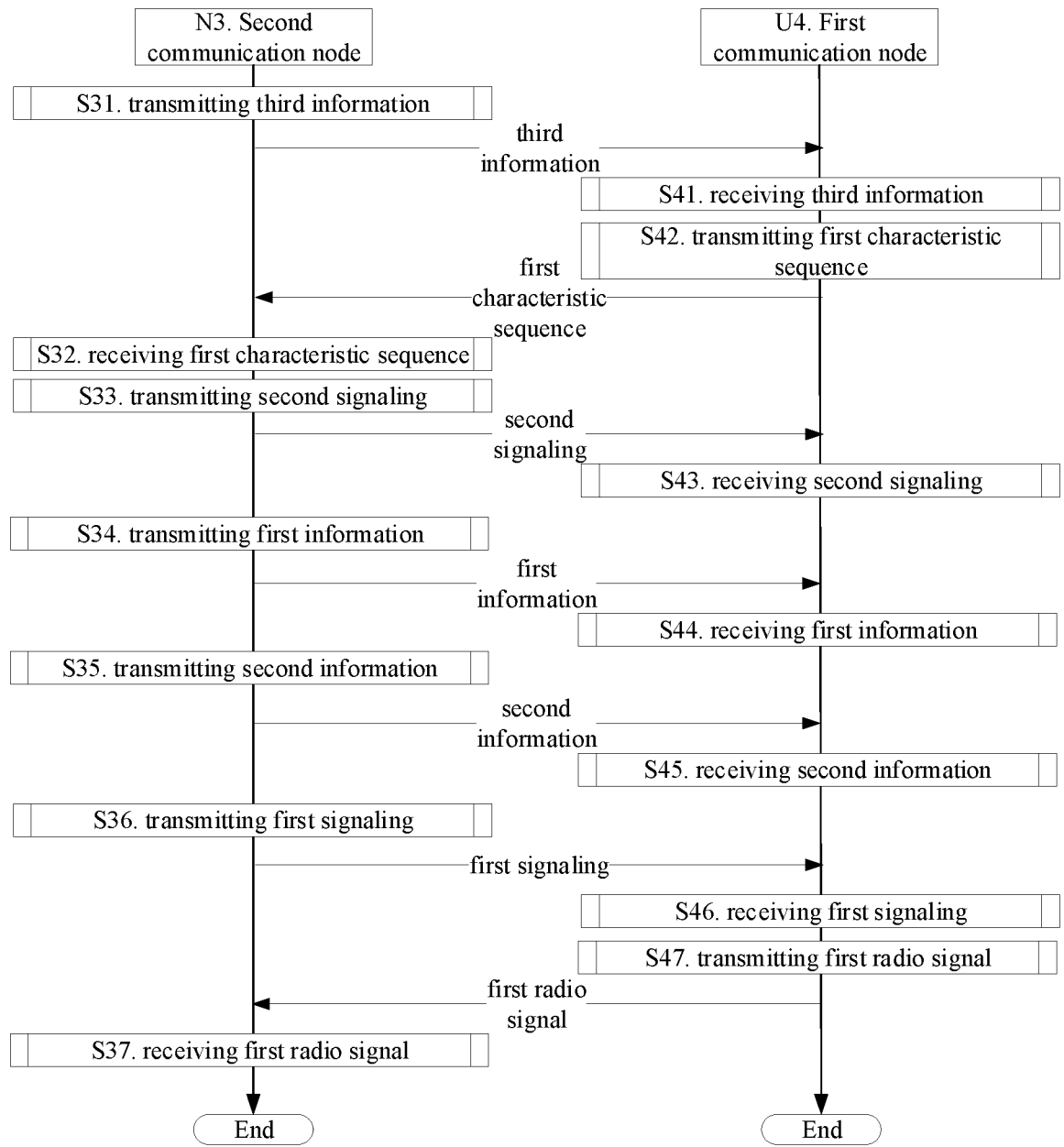
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, steps in the dashed box are optional. It is particularly underlined that the order illustrated in the embodiment does not put constraints over sequences of signal transmissions and implementations.

The second communication node N3 transmits third information in step S31, receives a first characteristic sequence in step S32, transmits a second signaling in step S33, transmits first information in step S34, transmits second information in step S35, transmits a first signaling in step S36, and receives a first radio signal in step S37.

The first communication node U4 receives third information in step S41, transmits a first characteristic sequence in step S42, receives a second signaling in step S43, receives first information in step S44, receives second information in step S45, receives a first signaling in step S46, and transmits a first radio signal in step S47.

In embodiment 6, an SCS of a subcarrier occupied by the first radio signal in the present disclosure in frequency domain is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol; the first signaling is used to determine a first time-domain resource; for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer; the third information is used to determine the first timing adjustment, or the third information is used to determine a transmission timing for the first characteristic sequence and the first timing adjustment; the first characteristic sequence is used for random access; the second signaling is used to determine the first SCS.

In one embodiment, the second signaling is a higher-layer signaling.

In one embodiment, the second signaling is a physical-layer signaling.

In one embodiment, the second signaling comprises all or part of a higher-layer signaling.

In one embodiment, the second signaling comprises all or part of a physical-layer signaling.

In one embodiment, the second signaling comprises all or partial IE in an RRC signaling.

In one embodiment, the second signaling comprises all or partial fields in an IE in a RRC signaling.

In one embodiment, the second signaling comprises all or partial fields in a CE in a MAC-layer signaling.

In one embodiment, the second signaling is transmitted through a DL-SCH.

In one embodiment, the second signaling is transmitted through a PDSCH.

In one embodiment, the second signaling comprises all or partial fields in Remaining System Information (RMSI).

In one embodiment, the second signaling is broadcast.

In one embodiment, the second signaling is unicast.

In one embodiment, the second signaling is Cell-Specific.

In one embodiment, the second signaling is UE-specific.

In one embodiment, the second signaling is transmitted through a PDCCH.

In one embodiment, the second signaling comprises all or partial fields of a DCI signaling.

In one embodiment, the second signaling being used to determine the first SCS means that: the second signaling is used by the first communication node to determine the first SCS.

In one embodiment, the second signaling being used to determine the first SCS means that: the second signaling is used to directly indicate the first SCS.

In one embodiment, the second signaling being used to determine the first SCS means that: the second signaling is used to indirectly indicate the first SCS.

In one embodiment, the second signaling being used to determine the first SCS means that: the second signaling is used to explicitly indicate the first SCS.

In one embodiment, the second signaling being used to determine the first SCS means that: the second signaling is used to implicitly indicate the first SCS.

In one embodiment, the second signaling being used to determine the first SCS means that: the second signaling indicates an SCS of a Bandwidth Part (BWP) to which frequency-domain resources occupied by the first radio signal, and the first SCS is equal to an SCS of a BWP to which frequency-domain resources occupied by the first radio signal belong.

In one embodiment, the second signaling is transmitted via an air interface.

In one embodiment, the second signaling is transmitted via a Uu interface.

In one embodiment, the second signaling is transmitted via a radio interface.

Embodiment 7

Figure 7:
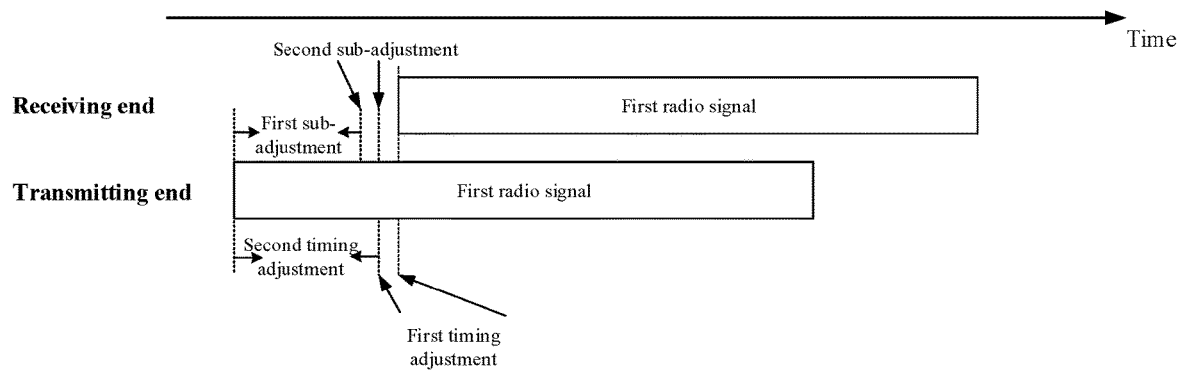
FIG. 7 illustrates a schematic diagram of relations among a first timing adjustment, a second timing adjustment and a transmission timing for a first radio signal according to one embodiment of the present disclosure.

Embodiment 7 illustrates a schematic diagram of relations among a first timing adjustment, a second timing adjustment and a transmission timing for a first radio signal according to one embodiment of the present disclosure, as shown in FIG. 7. In FIG. 7, the horizontal axis represents time, and the rectangle represents a first radio signal.

In embodiment 7, an SCS of a subcarrier occupied by the first radio signal in the present disclosure in frequency domain is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information in the present disclosure is used to determine the first sub-adjustment, and the second information in the present disclosure is used to determine the second sub-adjustment; for the first SCS in the present disclosure, an absolute value of the first sub-adjustment is equal to a time length of one or multiple multicarrier symbols, and a minimum step-size corresponding to the second sub-adjustment is less than a time length of one multicarrier symbol.

In one embodiment, the first timing adjustment is related to a type of the second communication node in the present disclosure.

In one embodiment, the first timing adjustment is related to a height of the second communication node in the present disclosure.

In one embodiment, the first timing adjustment is related to a type of a satellite to which the second communication node in the present disclosure belongs.

In one embodiment, the first timing adjustment is a TA maintained by the first communication node before transmitting the first radio signal.

In one embodiment, the first timing adjustment is an Old TA before transmitting the first radio signal.

In one embodiment, the first timing adjustment amount is equal to $N_{TA\_Old} \cdot T_c$, where $T_c = 1/(480 \cdot 10^3 \cdot 4096)$ second.

In one embodiment, the second timing adjustment is an adjustment value to TA based on the first timing adjustment when transmitting the first radio signal.

Embodiment 8

Figure 8:
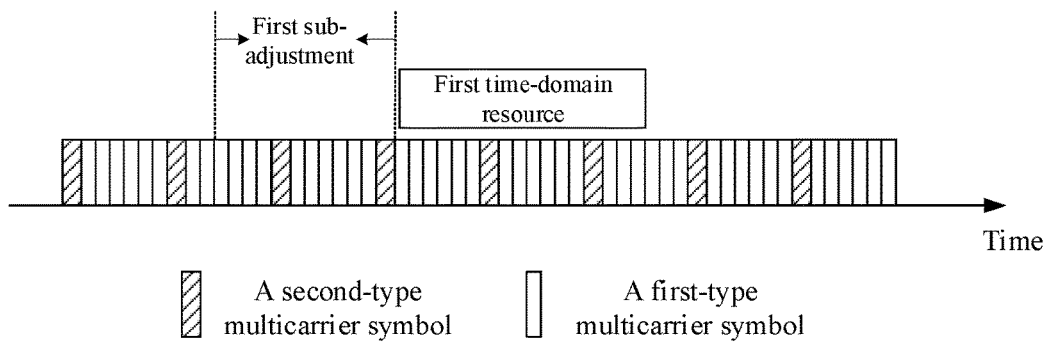
FIG. 8 illustrates a schematic diagram of a first-type multicarrier symbol and a second-type multicarrier symbol according to one embodiment of the present disclosure.

Embodiment 8 illustrates a schematic diagram of a first-type multicarrier symbol and a second-type multicarrier symbol according to one embodiment of the present disclosure, as shown in FIG. 8. In FIG. 8, the horizontal axis represents time length, each slash-filled rectangle represents a second-type multicarrier symbol, and each unfilled rectangle represents a first-type multicarrier symbol.

In embodiment 8, for the first SCS in the present disclosure, a time length of one first-type multicarrier symbol is equal to a first time length, a time length of one second-type multicarrier symbol is equal to a second time length, and the first time length is not equal to the second time length; an absolute value of the first sub-adjustment in the present disclosure is equal to a sum of K1 times the first time length and K2 times the second time length, and the first information in the present disclosure is used to indicate a sum of K1 and K2; a position of the first time-domain resource in the present disclosure in time domain is used to determine K2, K1 being a non-negative integer, K2 being a non-negative integer.

In one embodiment, the first time-domain resource comprises at least one multicarrier symbol.

In one embodiment, the first time-domain resource comprises at least one consecutive multicarrier symbol in time domain.

In one embodiment, the first time-domain resource comprises at least one consecutive slot in time domain.

In one embodiment, the first time-domain resource comprises at least one discrete multicarrier symbol in time domain.

In one embodiment, the first-type multicarrier symbol is a multicarrier symbol comprising a short CP.

In one embodiment, the first-type multicarrier symbol is an OFDM symbol comprising a short CP.

In one embodiment, the first-type multicarrier symbol is an OFDM symbol other than a first OFDM symbol in each half subframe.

In one embodiment, the first-type multicarrier symbol is a second OFDM symbol in each slot.

In one embodiment, the second-type multicarrier symbol is a multicarrier symbol comprising a long CP.

In one embodiment, the second-type multicarrier symbol is an OFDM symbol comprising a long CP.

In one embodiment, the second-type multicarrier symbol is a first OFDM symbol in each half subframe.

In one embodiment, the second-type multicarrier symbol is a first OFDM symbol in each slot.

In one embodiment, both the first-type multicarrier symbol and the second-type multicarrier symbol comprise a normal CP, and a length of CP comprised in the first-type multicarrier symbol is not equal to a length of CP comprised in the second-type multicarrier symbol.

In one embodiment, both the first-type multicarrier symbol and the second-type multicarrier symbol comprise an Extended CP, and a length of CP comprised in the first-type multicarrier symbol is not equal to a length of CP comprised in the second-type multicarrier symbol.

In one embodiment, a length of CP comprised in the first-type multicarrier symbol in the present disclosure is not equal to a length of CP comprised in the second-type multicarrier symbol.

In one embodiment, a number of time-domain resources occupied by the first radio signal in the present disclosure is equal to a number of time-domain resources comprised in the first time-domain resource.

In one embodiment, a number of multicarrier symbols occupied by the first radio signal in the present disclosure is equal to a number of multicarrier symbols comprised in the first time-domain resource.

In one embodiment, an absolute value of the first sub-adjustment is calculated by the following formula:

$$TA_{integer} = K1 \times L_1 + K2 \times L_2$$

herein, $TA_{integer}$ represents an absolute value of the first sub-adjustment, $L_1$ and $L_2$ respectively represent the first time length and the second time length.

In one embodiment, the above phrase of "the first information being used to indicate a sum of K1 and K2" includes: the first information is used to directly indicate a sum of K1 and K2.

In one embodiment, the above phrase of "the first information being used to indicate a sum of K1 and K2" includes: the first information is used to indirectly indicate a sum of K1 and K2.

In one embodiment, the above phrase of "the first information being used to indicate a sum of K1 and K2" includes: the first information is used to explicitly indicate a sum of K1 and K2.

In one embodiment, the above phrase of "the first information being used to indicate a sum of K1 and K2" includes: the first information is used to implicitly indicate a sum of K1 and K2.

In one embodiment, the above phrase of "the first information being used to indicate a sum of K1 and K2" includes: a sum of K1 and K2 is equal to K, and the first information is used to indicate K.

In one embodiment, the phrase of "a position of the first time-domain resource in time domain is used to determine K2" includes: a position of the first time-domain resource in time domain is used by the first communication node to determine K2.

In one embodiment, the phrase of "a position of the first time-domain resource in time domain is used to determine K2" includes: a position of the first time-domain resource in time domain is used to determine K2 based on a mapping relation.

In one embodiment, the position of the first time-domain resource in time domain refers to an index of a start multicarrier symbol of the first time-domain resource in a slot.

In one embodiment, the position of the first time-domain resource in time domain refers to an index of a start multicarrier symbol of the first time-domain resource in a subframe.

In one embodiment, the position of the first time-domain resource in time domain refers to a sequence of a start multicarrier symbol of the first time-domain resource in a slot.

In one embodiment, the position of the first time-domain resource in time domain refers to a sequence of a start multicarrier symbol of the first time-domain resource in a subframe.

In one embodiment, the phrase of "a position of the first time-domain resource in time domain is used to determine K2" includes: a sum of K1 and K2 is equal to K, when a start multicarrier symbol of the first time-domain resource is advanced by K multicarrier symbols, a position of the first time-domain resource in time domain and K are used to determine a number of the second-type multicarrier symbols comprised in the advanced K multicarrier symbols.

Embodiment 9

Figure 9:
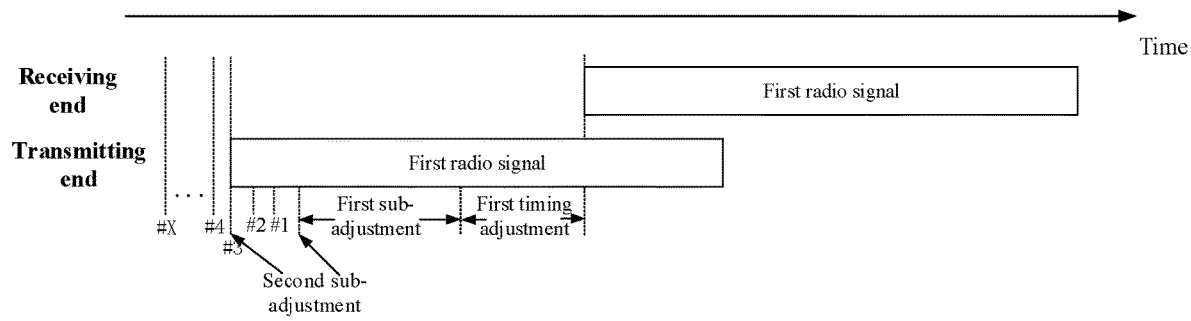
FIG. 9 illustrates a schematic diagram of X candidate sub-adjustments according to one embodiment of the present disclosure.

Embodiment 9 illustrates a schematic diagram of X candidate sub-adjustments according to one embodiment of the present disclosure, as shown in FIG. 9. In FIG. 9, the horizontal axis represents time, the upper and lower rectangles respectively represent first radio signals at the receiving end and the transmitting end, #1, #2, #3, . . . #X respectively represent start times for transmitting possible first radio signals corresponding to X candidate sub-adjustments.

In embodiment 9, the second sub-adjustment in the present disclosure is one of X candidate sub-adjustments, X being a positive integer greater than 1; the second information in the present disclosure is used to determine the second sub-adjustment out of the X candidate sub-adjustments, or the second information is used to determine the X candidate sub-adjustments.

In one embodiment, each of the X candidate sub-adjustments is measured by ps.

In one embodiment, each of the X candidate sub-adjustments is measured by s.

In one embodiment, each of the X candidate sub-adjustments comprises an integral number of $T_c$.

In one embodiment, each of the X candidate sub-adjustments is a real number.

In one embodiment, each of the X candidate sub-adjustments is a non-negative number.

In one embodiment, each of the X candidate sub-adjustments is a positive real number.

In one embodiment, there exists one of the X candidate sub-adjustments being equal to 0.

In one embodiment, X is a fixed positive integer.

In one embodiment, X is a variable positive integer.

In one embodiment, X is a predefined positive integer.

In one embodiment, the above phrase of "the second information being used to determine the second sub-adjustment out of the X candidate sub-adjustments" includes: the second information is used by the first communication node to determine the second sub-adjustment out of the X candidate sub-adjustments.

In one embodiment, the above phrase of "the second information being used to determine the second sub-adjustment out of the X candidate sub-adjustments" includes: the second information is used to directly indicate the second sub-adjustment out of the X candidate sub-adjustments.

In one embodiment, the above phrase of "the second information being used to determine the second sub-adjustment out of the X candidate sub-adjustments" includes: the second information is used to indirectly indicate the second sub-adjustment out of the X candidate sub-adjustments.

In one embodiment, the above phrase of "the second information being used to determine the second sub-adjustment out of the X candidate sub-adjustments" includes: the second information is used to explicitly indicate the second sub-adjustment out of the X candidate sub-adjustments.

In one embodiment, the above phrase of "the second information being used to determine the second sub-adjustment out of the X candidate sub-adjustments" includes: the second information is used to implicitly indicate the second sub-adjustment out of the X candidate sub-adjustments.

In one embodiment, the phrase of "the second information being used to determine the X candidate sub-adjustments" includes: the second information is used by the first communication node to determine the X candidate sub-adjustments.

In one embodiment, the phrase of "the second information being used to determine the X candidate sub-adjustments" includes: the second information is used to directly indicate the X candidate sub-adjustments.

In one embodiment, the phrase of "the second information being used to determine the X candidate sub-adjustments" includes: the second information is used to indirectly indicate the X candidate sub-adjustments.

In one embodiment, the phrase of "the second information being used to determine the X candidate sub-adjustments" includes: the second information is used to explicitly indicate the X candidate sub-adjustments.

In one embodiment, the phrase of "the second information being used to determine the X candidate sub-adjustments" includes: the second information is used to implicitly indicate the X candidate sub-adjustments.

In one embodiment, the phrase in claim 1 in the present disclosure of "the second information being used to determine the second sub-adjustment" refers to: the second information is used to determine the X candidate sub-adjustments.

In one embodiment, the phrase in claim 1 in the present disclosure of "the second information being used to determine the second sub-adjustment" refers to: the second information is used to determine the second sub-adjustment out of the X candidate sub-adjustments.

In one embodiment, a transmitter of the first radio signal determines the second sub-adjustment out of the X candidate sub-adjustments.

In one embodiment, a transmitter of the first radio signal determines the second sub-adjustment by itself out of the X candidate sub-adjustments according to position information of the first communication node and position information of the second communication node.

In one embodiment, a transmitter of the first radio signal determines the second sub-adjustment by itself out of the X candidate sub-adjustments according to position information of the first communication node and ephemeris information of the second communication node.

In one embodiment, a transmitter of the first radio signal determines the second sub-adjustment by itself out of the X candidate sub-adjustments according to position information of the first communication node, movement speed of the first communication node and ephemeris information of the second communication node.

In one embodiment, when the second information is used to determine the X candidate sub-adjustments, a transmitter of the first radio signal determines the second sub-adjustment out of the X candidate sub-adjustments.

In one embodiment, when the second information is used to determine the second sub-adjustment out of the X candidate sub-adjustments, the X candidate sub-adjustments are fixed.

In one embodiment, when the second information is used to determine the second sub-adjustment out of the X candidate sub-adjustments, the X candidate sub-adjustments are pre-defined.

In one embodiment, a minimum value of a difference value between any two of the X candidate sub-adjustments is greater than $T_c \cdot 16 \cdot 64/\emptyset$, where $T_c = 1/(480 \cdot 10^3 \cdot 4096)$, $\emptyset$ is equal to a ratio of the first SCS to 15 kHz.

In one embodiment, a minimum value of a difference value between any two of the X candidate sub-adjustments is equal to $T_c \cdot 16 \cdot 64/\emptyset$, where $T_c = 1/(480 \cdot 10^3 \cdot 4096)$, $\emptyset$ is equal to a ratio of the first SCS to 15 kHz.

In one embodiment, a minimum value of a difference value between any two of the X candidate sub-adjustments is equal to $Q \cdot T_c \cdot 16 \cdot 64/\emptyset$, where $T_c = 1/(480 \cdot 10^3 \cdot 4096)$, $\emptyset$ is equal to a ratio of the first SCS to 15 kHz, Q being a positive integer greater than 1.

In one embodiment, a minimum value of a difference value between any two of the X candidate sub-adjustments is equal to $Q \cdot T_c \cdot 16 \cdot 64/\emptyset$, where $T_c = 1/(480 \cdot 10^3 \cdot 4096)$, $\emptyset$ is equal to a ratio of the first SCS to 15 kHz, Q is a positive integer greater than 1, Q is configurable, or Q is fixed.

Embodiment 10

Figures 10, 11:
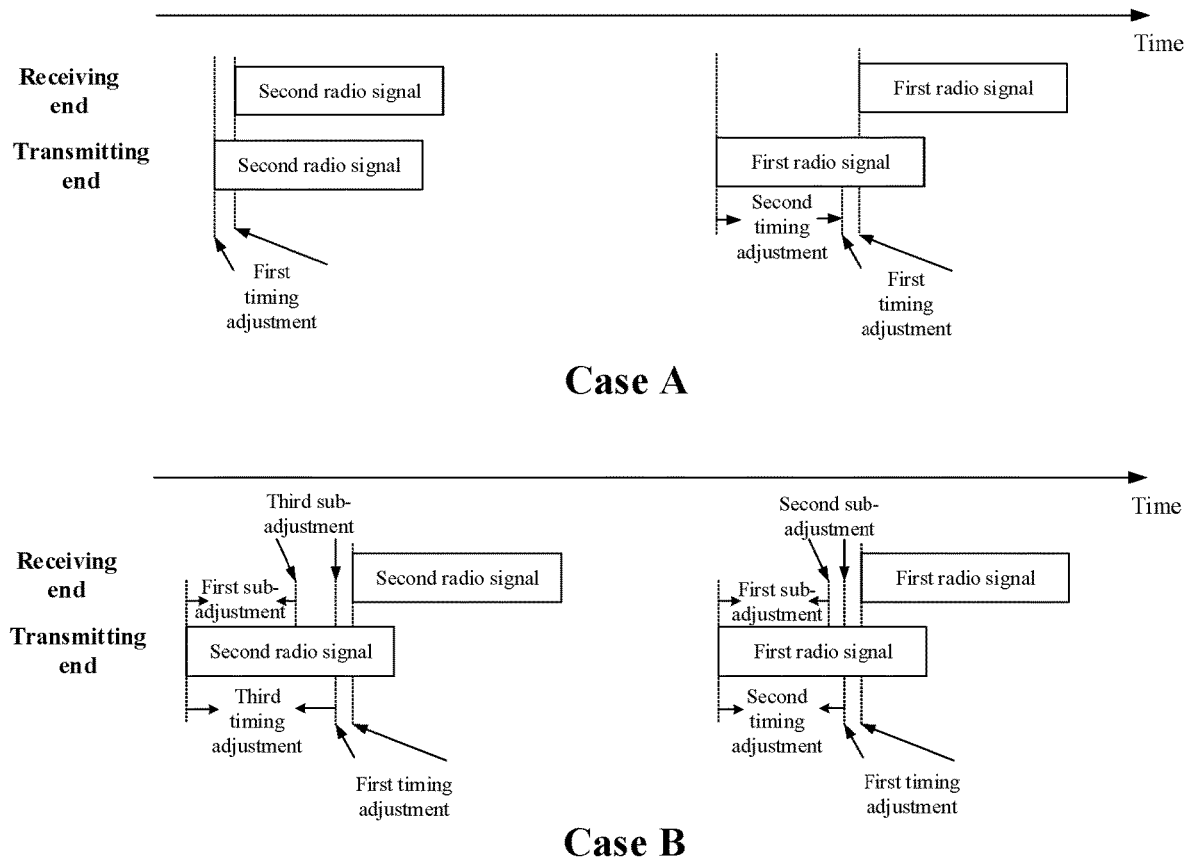
FIG. 10 illustrates a schematic diagram of a relation between a transmission timing for a first radio signal and a transmission timing for a second radio signal according to one embodiment of the present disclosure.
FIG. 11 illustrates a schematic diagram of a first timing offset according to one embodiment of the present disclosure.

Embodiment 10 illustrates a schematic diagram of a relation between a transmission timing for a first radio signal and a transmission timing for a second radio signal according to one embodiment of the present disclosure, as shown in FIG. 10. In FIG. 10, the horizontal axis represents time, and the rectangles represent a first radio signal at the transmitting end, a first radio signal at the receiving end, a second radio signal at the transmitting end and a second radio signal at the receiving end respectively.

In embodiment 10, the first timing adjustment in the present disclosure is used to determine a transmission timing for the second radio signal in the present disclosure, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal in the present disclosure.

In one embodiment, the second radio signal is transmitted through an Uplink Shared Channel (UL-SCH).

In one embodiment, the second radio signal is used to carry Msg3 in a random access procedure.

In one embodiment, the second radio signal is used to carry MsgB in a random access procedure.

In one embodiment, the second radio signal is a data part in MsgA in a random access procedure.

In one embodiment, the second radio signal is transmitted through a PUSCH.

In one embodiment, the second radio signal is transmitted through a PUCCH.

In one embodiment, the second radio signal is transmitted through a SRS.

In one embodiment, the second radio signal is transmitted through a UL DMRS.

In one embodiment, the second radio signal is obtained by all or partial bits of a Transport Block (TB) sequentially subjected to TB CRC insertion, Code Block Segmentation, code block CRC insertion, Rate Matching, Concatenation, Scrambling, Modulation Mapper, Layer Mapper, Precoding, Resource Element Mapper, and Baseband Signal Generation.

In one embodiment, the above sentence "the first timing adjustment is used to determine a transmission timing for the second radio signal" includes: the first timing adjustment is used by the first communication node to determine a transmission timing for the second radio signal.

In one embodiment, the above phrase of "the first timing adjustment being used to determine a transmission timing for the second radio signal" includes: the first timing adjustment is equal to a TA for transmitting the second radio signal.

In one embodiment, the above phrase of "the first timing adjustment being used to determine a transmission timing for the second radio signal" includes: the first timing adjustment is used to calculate a TA for transmitting the second radio signal.

In one embodiment, the above phrase of "the first timing adjustment being used to determine a transmission timing for the second radio signal" includes: the first timing adjustment is used to calculate a TA for transmitting the second radio signal, and the first timing adjustment is less than a TA for transmitting the second radio signal.

In one embodiment, the above phrase of "a sum of the first timing adjustment and a third timing adjustment being used to determine a transmission timing for the second radio signal" includes: a sum of the first timing adjustment and the third timing adjustment is used by the first communication node to determine a transmission timing for the second radio signal.

In one embodiment, the above phrase of "a sum of the first timing adjustment and a third timing adjustment being used to determine a transmission timing for the second radio signal" includes: a sum of the first timing adjustment and the third timing adjustment is equal to a TA for transmitting the second radio signal.

In one embodiment, the above phrase of "a sum of the first timing adjustment and a third timing adjustment being used to determine a transmission timing for the second radio signal" includes: a sum of the first timing adjustment and the third timing adjustment is used to calculate a TA for transmitting the second radio signal.

In one embodiment, the third sub-adjustment is a real number.

In one embodiment, the third sub-adjustment is measured by ps.

In one embodiment, the third sub-adjustment is measured by s.

In one embodiment, the third sub-adjustment is a positive number.

In one embodiment, the third sub-adjustment is a negative number.

In one embodiment, the third sub-adjustment is a positive number or the third sub-adjustment is equal to 0.

In one embodiment, the third sub-adjustment is a negative number or the third sub-adjustment is equal to 0.

In one embodiment, the third sub-adjustment is equal to an integral number of $T_c$, where $T_c=1/(480 \cdot 10^3 \cdot 4096)$ second.

In one embodiment, the above phrase of "the third sub-adjustment being configurable" includes: the third sub-adjustment is explicitly configured through a signaling.

In one embodiment, the above phrase of "the third sub-adjustment being configurable" includes: the third sub-adjustment is implicitly configured via a signaling.

Embodiment 11

Embodiment 11 illustrates a schematic diagram of a first timing offset according to one embodiment of the present disclosure; as shown in FIG. 11. In FIG. 11, the first column on the left represents frequency range and duplex mode, and the second column on the left represents a first timing offset, and a unit for measurement is $T_c=1/(480 \cdot 10^3 \cdot 4096)$ second.

In embodiment 11, a first timing offset is used to determine the first timing adjustment in the present disclosure, an absolute value of the first timing offset is not greater than an absolute value of the first timing adjustment, a duplex mode of a cell where a transmission of the first radio signal occurs in the present disclosure and a frequency range to which frequency-domain resources occupied by the first radio signal belong are used to determine the first timing offset.

In one embodiment, the first timing offset is equal to 0.

In one embodiment, the first timing offset is greater than 0.

In one embodiment, the first timing offset is a real number.

In one embodiment, the first timing offset is measured by ps.

In one embodiment, the first timing offset is measured by s.

In one embodiment, the first timing offset is equal to $N_{TA,offset}$.

In one embodiment, when the first timing offset is greater than 0, the first timing offset is used to provide time for switching from uplink transmission to downlink transmission in the TDD system.

In one embodiment, the first timing offset amount is equal to an integral number of $T_c$, where $T_c=1/(480 \cdot 10^3 \cdot 4096)$ second.

In one embodiment, the phrase of "a first timing offset being used to determine the first timing adjustment" includes: the first timing offset is used by the first communication node to determine the first timing adjustment.

In one embodiment, the phrase of "a first timing offset being used to determine the first timing adjustment" includes: a sum of the first timing offset and a TA indicated in an RAR is equal to the first timing adjustment.

In one embodiment, an absolute value of the first timing offset is less than an absolute value of the first timing adjustment.

In one embodiment, an absolute value of the first timing offset is equal to an absolute value of the first timing adjustment.

In one embodiment, a duplex mode of a cell where a transmission of the first radio signal occurs is Time Division Duplexing (TDD), or a duplex mode of a cell where a transmission of the first radio occurs is Frequency Division Duplexing (FDD).

In one embodiment, a frequency range to which frequency-domain resources occupied by the first radio signal belong is Frequency Range 1 (FR1), or a frequency range to which frequency-domain resources occupied by the first radio signal belong is Frequency Range 2 (FR2).

In one embodiment, a frequency ranges to which frequency-domain resources occupied by the first radio signal belong is one of Y frequency ranges, Y being a positive integer greater than 1, any two of the Y frequency ranges are not overlapping, and an index of a frequency range to which frequency-domain resources occupied by the first radio signal belong in the Y frequency ranges is used to determine the first timing offset.

Embodiment 12

Figure 12:
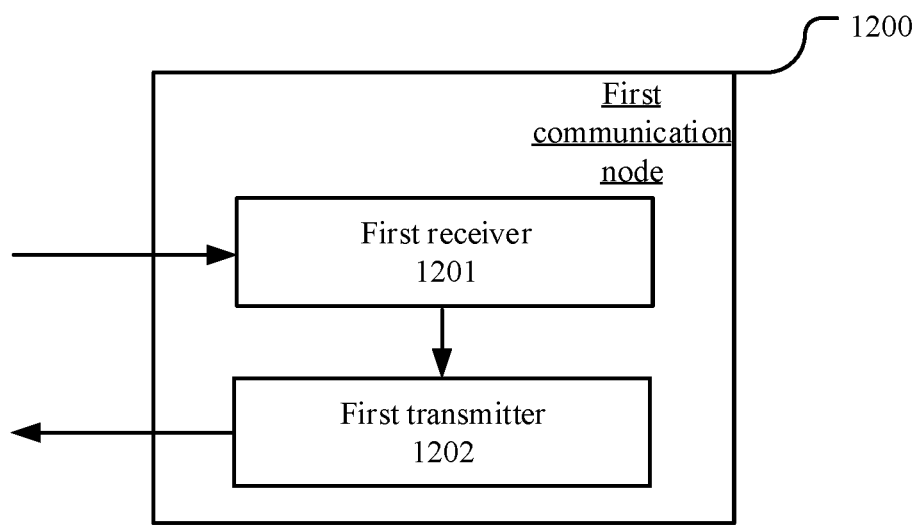
FIG. 12 illustrates a structure block diagram of a processing device in a first communication node according to one embodiment of the present disclosure.

Embodiment 12 illustrates a structure block diagram of a processing device in a first communication node, as shown in FIG. 12. In FIG. 12, a first communication node's processing device 1200 comprises a first receiver 1201 and a first transmitter 1202. The first receiver 1201 comprises the transmitter/receiver 456 (including the antenna 460), the receiving processor 452 and the controller/processor 490 in FIG. 4 of the present disclosure; the first transmitter 1202 comprises the transmitter/receiver 456 (including the antenna 460), the transmitting processor 455 and the controller/processor 490 in FIG. 4 of the present disclosure.

In embodiment 12, the first receiver 1201 receives first information and second information; the first transmitter 1202 transmits a first radio signal, an SCS of a subcarrier occupied by the first radio signal in frequency domain is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the first receiver 1201 receives a first signaling, and the first signaling is used to determine a first time-domain resource; herein, for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer.

In one embodiment, the second sub-adjustment is one of X candidate sub-adjustments, X being a positive integer greater than 1; the second information is used to determine the second sub-adjustment out of the X candidate sub-adjustments, or the second information is used to determine the X candidate sub-adjustments.

In one embodiment, the first receiver 1201 receives third information; the first transmitter transmits a first characteristic sequence; herein, the third information is used to determine the first timing adjustment, or the third information is used to determine a transmission timing for the first characteristic sequence and the first timing adjustment; the first characteristic sequence is used for random access.

In one embodiment, the first transmitter 1202 transmits a second radio signal; herein, the first timing adjustment is used to determine a transmission timing for the second radio signal, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal.

In one embodiment, a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

In one embodiment, the first receiver 1201 receives a second signaling; herein, the second signaling is used to determine the first SCS.

Embodiment 13

Figure 13:
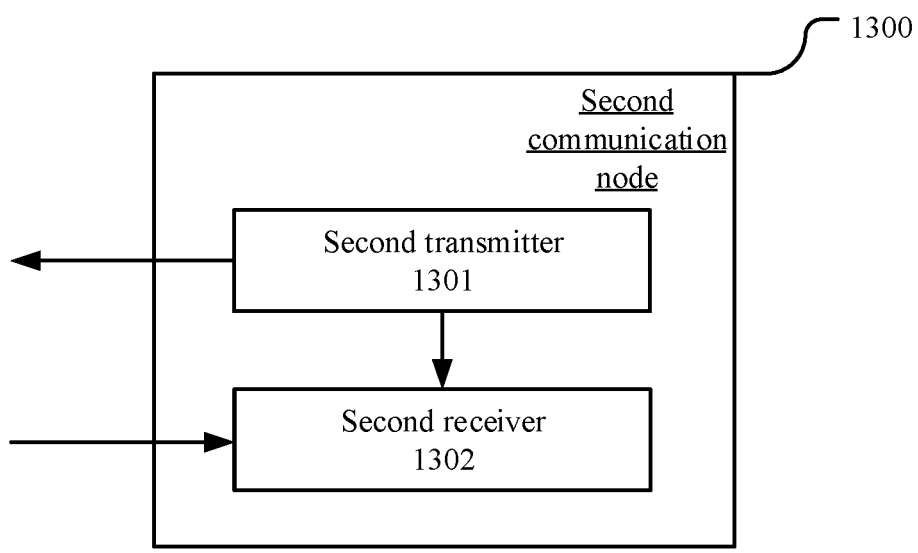
FIG. 13 illustrates a structure block diagram of a processing device in a second communication node according to one embodiment of the present disclosure.

Embodiment 13 illustrates a structure block diagram of a processing device in a second communication node, as shown in FIG. 13. In FIG. 13, a second communication node processing device 1300 comprises a second transmitter 1301 and a second receiver 1302. The second transmitter 1301 comprises the transmitter/receiver 416 (including the antenna 420), the transmitting processor 415 and the controller/processor 440 in FIG. 4 of the present disclosure; the second transmitter 1302 comprises the transmitter/receiver 416 (including the antenna 420), the receiving processor 412 and the controller/processor 440 in FIG. 4 of the present disclosure.

In Embodiment 13, the second transmitter 1301 transmits first information and second information; the second receiver 1302 receives a first radio signal, an SCS of a subcarrier occupied by the first radio signal in frequency domain is equal to a first SCS; a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; for the first SCS, an absolute value of the first sub-adjustment is equal to a time length of one or multiple multicarrier symbols, and a minimum step-size corresponding to the second sub-adjustment is less than a time length of one multicarrier symbol.

In one embodiment, the second transmitter 1301 transmits a first signaling, and the first signaling is used to determine a first time-domain resource; for the first SCS, a time length of one first-type multicarrier symbol is equal to a first time length, a time length of one second-type multicarrier symbol is equal to a second time length, and the first time length is not equal to the second time length; an absolute value of the first sub-adjustment is equal to a sum of K1 times the first time length and K2 times the second time length, and the first information is used to indicate a sum of K1 and K2; a position of the first time-domain resource in time domain is used to determine K2, K1 being a non-negative integer, K2 being a non-negative integer.

In one embodiment, the second sub-adjustment is one of X candidate sub-adjustments, X being a positive integer greater than 1; the second information is used to determine the second sub-adjustment out of the X candidate sub-adjustments, or the second information is used to determine the X candidate sub-adjustments.

In one embodiment, the second transmitter 1301 transmits third information; the second receiver 1302 receives a first characteristic sequence; the third information is used to determine the first timing adjustment, or the third information is used to determine a transmission timing for the first characteristic sequence and the first timing adjustment; the first characteristic sequence is used for random access.

In one embodiment, the second receiver 1302 receives a second radio signal; the first timing adjustment is used to determine a transmission timing for the second radio signal, or a sum of the first timing adjustment and a third timing adjustment is used to determine a transmission timing for the second radio signal; the third timing adjustment is equal to a sum of the first sub-adjustment and a third sub-adjustment, and the third sub-adjustment is configurable; a start time for transmitting the second radio signal is earlier than a start time for transmitting the first radio signal.

In one embodiment, a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

In one embodiment, the second transmitter 1301 transmits a second signaling; the second signaling is used to determine the first SCS.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, eMTC devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node for wireless communications, comprising:
  a first receiver, receiving first information and second information, the first information and the second information are transmitted as two different fields in a same signaling; and
  a first transmitter, transmitting a first radio signal, a Subcarrier Spacing (SCS) of a subcarrier occupied by the first radio signal in frequency domain being equal to a first SCS, the first radio signal carries Msg3;
  wherein a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; the first sub-adjustment is equal to an integral number of $T_c$, the second sub-adjustment is equal to an integral number of $T_c$, where $T_c=1/(480 \cdot 10^3 \cdot 4096)$ second; for the first SCS, an absolute value of the first sub-adjustment is equal to a time length of one or multiple multicarrier symbols, the absolute value of the first sub-adjustment is equal to a time length of at least one slot, and a minimum step-size corresponding to the second sub-adjustment is less than a time length of one multicarrier symbol, the minimum step-size corresponding to the second sub-adjustment is a minimum granularity when configuring the second sub-adjustment.

2. The first communication node according to claim 1, wherein the first information comprises all or partial fields in an Information Elements (IE) in a Radio Resource Control (RRC) signaling, the first information is cell-specific; the first radio signal is transmitted through a Physical Uplink Shared Channel (PUSCH), the first radio signal occupies more than one subcarrier in frequency domain, and SCSs of any two subcarriers occupied by the first radio signal in frequency domain are equal; the first timing adjustment is used to determine a TA of a radio signal transmitted earlier than the first radio signal, the first timing adjustment is positive or the first timing adjustment is equal to 0.

3. The first communication node according to claim 1, wherein the second sub-adjustment is one of X candidate sub-adjustments, X being a positive integer greater than 1; the second information is used to determine the second sub-adjustment out of the X candidate sub-adjustments.

4. The first communication node according to claim 1, wherein the first receiver receives third information; the first transmitter transmits a first characteristic sequence; wherein the third information is used to determine the first timing adjustment; the first characteristic sequence is used for random access.

5. The first communication node according to claim 1, wherein the first transmitter transmits a second radio signal; wherein the first timing adjustment is used to determine a transmission timing for the second radio signal; a start time for transmitting the second radio signal is earlier than a start time for transmitting the first radio signal.

6. The first communication node according to claim 1, wherein a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

7. The first communication node according to claim 1, wherein the first receiver receives a second signaling; wherein the second signaling is used to determine the first SCS.

8. A second communication node for wireless communications, comprising:
  a second transmitter, transmitting first information and second information, the first information and the second information are transmitted as two different fields in a same signaling; and
  a second receiver, receiving a first radio signal, an SCS of a subcarrier occupied by the first radio signal in frequency domain being equal to a first SCS, the first radio signal carries Msg3;
  wherein a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; the first sub-adjustment is equal to an integral number of $T_c$, the second sub-adjustment is equal to an integral number of $T_c$, where $T_c=1/(480 \cdot 10^3 \cdot 4096)$ second; for the first SCS, an absolute value of the first sub-adjustment is equal to a time length of one or multiple multicarrier symbols, the absolute value of the first sub-adjustment is equal to a time length of at least one slot, and a minimum step-size corresponding to the second sub-adjustment is less than a time length of one multicarrier symbol, the minimum step-size corresponding to the second sub-adjustment is a minimum granularity when configuring the second sub-adjustment.

9. The second communication node according to claim 8, wherein the first information comprises all or partial fields in an Information Elements (JE) in a Radio Resource Control (RRC) signaling, the first information is cell-specific; the first radio signal is transmitted through a Physical Uplink Shared Channel (PUSCH), the first radio signal occupies more than one subcarrier in frequency domain, and SCSs of any two subcarriers occupied by the first radio signal in frequency domain are equal; the first timing adjustment is used to determine a TA of a radio signal transmitted earlier than the first radio signal, the first timing adjustment is positive or the first timing adjustment is equal to 0.

10. The second communication node according to claim 8, wherein the second sub-adjustment is one of X candidate sub-adjustments, X being a positive integer greater than 1; the second information is used to determine the second sub-adjustment out of the X candidate sub-adjustments.

11. The second communication node according to claim 8, wherein the second transmitter transmits third information; a second receiver receives a first characteristic sequence; wherein the third information is used to determine the first timing adjustment; the first characteristic sequence is used for random access.

12. The second communication node according to claim 8, wherein the second receiver receives a second radio signal; wherein the first timing adjustment is used to determine a transmission timing for the second radio signal; a start time for transmitting the second radio signal is earlier than a start time for transmitting the first radio signal.

13. The second communication node according to claim 8, wherein a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

14. A method in a first communication node for wireless communications, comprising:
receiving first information and second information, the first information and the second information are transmitted as two different fields in a same signaling; and
transmitting a first radio signal, an SCS of a subcarrier occupied by the first radio signal in frequency domain being equal to a first SCS, the first radio signal carries Msg3;
wherein a sum of a first timing adjustment and a second timing adjustment is used to determine a transmission timing for the first radio signal, and the first timing adjustment is used to determine a transmission timing for a radio signal transmitted earlier than the first radio signal; the second timing adjustment is equal to a sum of a first sub-adjustment and a second sub-adjustment, the first information is used to determine the first sub-adjustment, and the second information is used to determine the second sub-adjustment; the first sub-adjustment is equal to an integral number of $T_c$, the second sub-adjustment is equal to an integral number of $T_c$, where $T_c=1/(480 \cdot 10^3 \cdot 4096)$ second; for the first SCS, an absolute value of the first sub-adjustment is equal to a time length of one or multiple multicarrier symbols, the absolute value of the first sub-adjustment is equal to a time length of at least one slot, and a minimum step-size corresponding to the second sub-adjustment is less than a time length of one multicarrier symbol, the minimum step-size corresponding to the second sub-adjustment is a minimum granularity when configuring the second sub-adjustment.

15. The method in a first communication node according to claim 14, wherein the first information comprises all or partial fields in an Information Elements (IE) in a Radio Resource Control (RRC) signaling, the first information is cell-specific; the first radio signal is transmitted through a Physical Uplink Shared Channel (PUSCH), the first radio signal occupies more than one subcarrier in frequency domain, and SCSs of any two subcarriers occupied by the first radio signal in frequency domain are equal; the first timing adjustment is used to determine a TA of a radio signal transmitted earlier than the first radio signal, the first timing adjustment is positive or the first timing adjustment is equal to 0.

16. The method in a first communication node according to claim 14, wherein the second sub-adjustment is one of X candidate sub-adjustments, X being a positive integer greater than 1; the second information is used to determine the second sub-adjustment out of the X candidate sub-adjustments.

17. The method in a first communication node according to claim 14, comprising:
receiving third information; and
transmitting a first characteristic sequence;
wherein the third information is used to determine the first timing adjustment; the first characteristic sequence is used for random access.

18. The method in a first communication node according to claim 14, comprising:
transmitting a second radio signal;
wherein the first timing adjustment is used to determine a transmission timing for the second radio signal; a start time for transmitting the second radio signal is earlier than a start time for transmitting the first radio signal.

19. The method in a first communication node according to claim 14, wherein a first timing offset is used to determine the first timing adjustment, an absolute value of the first timing offset is not greater than an absolute value of the first timing adjustment, a duplex mode of a cell where a transmission of the first radio signal occurs and a frequency range to which frequency-domain resources occupied by the first radio signal belong are used to determine the first timing offset.

20. The method in a first communication node according to claim 14, comprising:
receiving a second signaling;
wherein the second signaling is used to determine the first SCS.

* * * * *